United States Patent Office 3,398,998
Patented Aug. 27, 1968

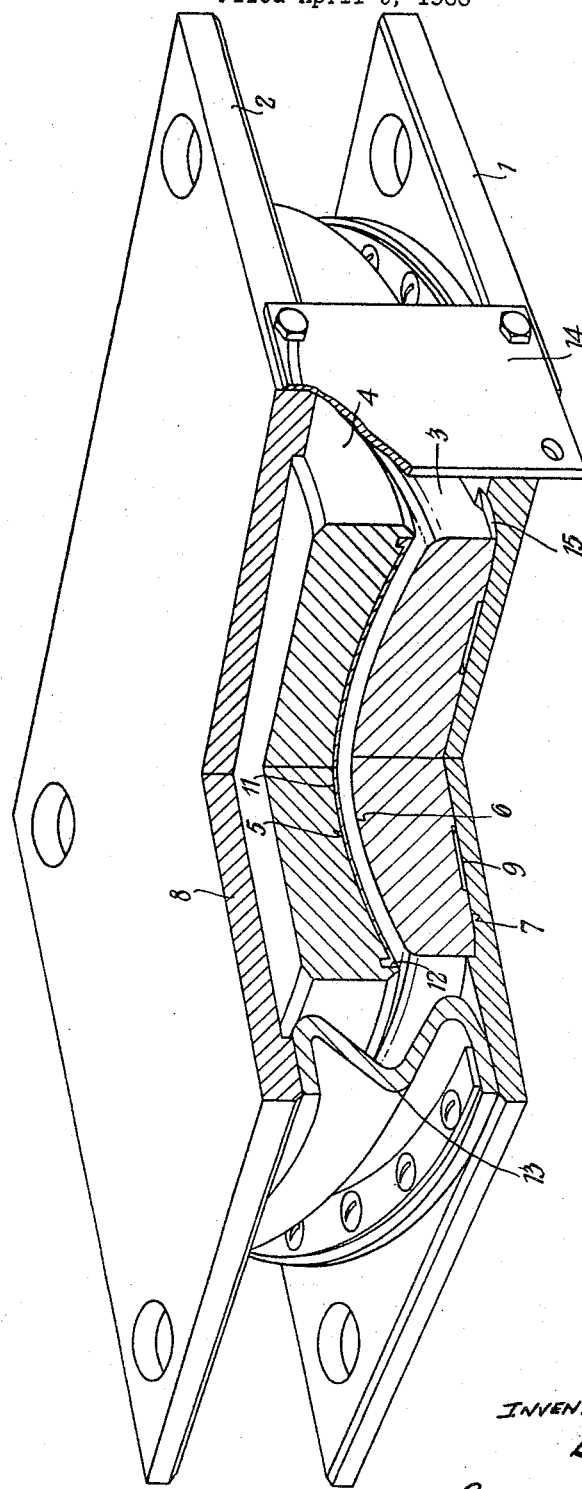

3,398,998
BEARING UNITS
Frank Burnett, Costa Mesa, Calif., assignor, by mesne assignments, to Lear Siegler, Inc., Santa Monica, Calif., a corporation of Delaware
Filed Apr. 5, 1966, Ser. No. 540,249
Claims priority, application Great Britain, Apr. 8, 1965, 15,041/65
1 Claim. (Cl. 308—3)

ABSTRACT OF THE DISCLOSURE

A structural bearing unit for use in bridge and other constructions to accommodate movement between structural members. A pair of blocks having coacting spherical bearing surfaces are recessed in upper and lower load supporting plates to prevent linear movement of the plates relative to one another while permitting annular movement thereof.

---

According to the present invention there is provided a bearing unit composed of a lower base member and an upper load supporting member, said members being provided with cooperating part-spherical bearing surfaces to accommodate relative angular displacement between said members and one of said bearing surfaces being constituted by a non-metallic bearing material.

In order that the invention may be more fully understood one construction of bearing unit in accordance with the invention and for use in bridge and other constructions will now be described, by way of example, with reference to the accompanying drawing which shows a perspective view of the bearing with a portion of the unit removed, to show a section through the bearing.

Referring to the drawing, the unit is composed of a lower base member in the form of a plate 1 and an upper load supporting member in the form of a further plate 2, the plates 1 and 2 being separated by two blocks 3 and 4 which are respectively recessed into the plates and which have co-operating part-spherical bearing surfaces. Thus, the block 3 is recessed in the lower plate 1 to prevent movement thereof in all directions in a plane parallel to the lower plate and the block 4 is recessed in the upper plate 8 to prevent movement thereof in all directions in a plane parallel to the upper plate. In the unit under consideration, the upper block 4 is provided with a recessed bearing surface 5 and the lower block with a domed bearing surface 6 which seats in the recessed surface but it would, of course, be possible to interchange the recessed and domed surfaces on the two blocks. Whilst the plates are conveniently square-shaped in plan and are provided with apertures whereby they can be bolted to structural parts of the bridge or other construction between which movement is required to be accommodated, the blocks are preferably of circular form and therefore seat in circular recesses 7 and 8 formed on the inner faces of the two plates. The blocks may be secured to their respective plates by means of bolts or studs, or they may be bonded in position by a suitable bonding medium, for example, Araldite, in which case the face of the blocks in contact with the plates may be recessed as indicated at 9 for the reception of bonding medium, or they may simply rest in the recesses in the plates. Alternatively they may be formed integrally with the plates.

Conveniently the plates are of low carbon steel and as far as the blocks are concerned, the upper block 4 may be of corrosion resistant cast-iron and the lower block 3 of stainless steel. The bearing surface on the upper block is constituted by a layer 11 of low friction material composed of or incorporating woven fibres of, for example, polytetrafluoroethylene, e.g. the material known under the name of Fiberglide, which is secured to the material of the block itself and which may be in the form of a woven or knitted fabric. Other examples of suitable synthetic material include nylon, courtelle or Terylene. The facing or lining may be on the lower, stainless steel, block.

In order to exclude dirt, moisture, and other foreign matter from passing between the bearing surfaces 5 and 6, a groove may be provided around the bearing surface on one of the block, e.g. the block 4 as shown in the drawing, with the groove inset slightly from the edge of the block, and a continuous flexible seal 12 of neoprene, ethylene propylene, polyurethane, rubber or other suitable material located in the groove so as to project therefrom into wiping contact with the bearing surface on the other block. Furthermore, a flexible or elastomeric dust seal 13, for example, of weather resistant synthetic rubber, may be provided between the facing margins of the plate members so as to surround the bearing blocks. This latter seal may be secured between the plate margins in a convenient manner, such as by bolts 14, and this sealing ring will be extremely flexible so as not to interfere with relative movement between the plate members.

The bearing unit may be incorporated in a bridge structure with the plate 1, for example, secured to the top of a bridge pier, whilst the plate 2 may carry a crossing structural member of the bridge. The bearing unit may, of course, be used between any other two members of the bridge structure which require interconnection whilst allowing some degree of movement therebetween, the unit being completely reversible and usable in any desired position according to requirements. As will be appreciated the part-spherical bearing surfaces 5 and 6 accommodate relative angular displacement between the plates 1 and 2 that is to say, angular movement of one of the plates relative to the other either in the plane of the one member or in a plane perpendicular to the other member. The construction of the bearing unit therefore enables the plates to move relatively to one another in an angular or twisting relationship so that movements resulting from misalignment of the interconnected structural members from whatever cause may be accommodated. For example, such misalignment might be due to bowing or twisting of one or both of the connected structural members or to variations between individual pier heights or to various manufacturing or installation inaccuracies within the tolerances allowed. Allowance will also have to be made for movement resulting from expansion and contraction of the crossing structural member and the bearing unit of the invention, which provides longitudinal restraint at the end of the crossing member supported by the bearing, will normally be used in conjunction with a second bearing unit preferably disposed at the other end of the member, for example, the bearing unit forming the subject of U.S. Patent No. 3,329,472, or the bearing unit forming the subject of copending patent application Ser. No. 540,345 filed Apr. 5, 1966, to allow for such expansion or contraction. The particular bearing unit under consideration is designed for loads of 300 tons but clearly units of the invention may be designed for larger or smaller loads.

In order to maintain the components of the bearing unit in the correct relative position during transportation of the unit prior to fitting, the plates may be secured by two oppositely arranged clamp plates one of which is shown at 14 and which are bolted to the edges of the two plate members. To enable the unit to be fitted with any desired relative offset between the plates, that is, with the plates angularly displaced from a parallel position, graduated scales may be provided on one of the plate members for cooperation with a side edge on each of the plates and the provision of the scales allows the plates to be set in the correct relative position notwithstanding any extremes of ambient temperature affecting the length of the crossing member. Instead of disposing the clamp plates opposite one another, they may lie in planes at right angles to one another which allows the top plate to be set at a compound angle to the lower plate if this should be necessary. Arcuate slots would be provided in each plate to allow for such adjustment. The clamp plates are preferably of synthetic resinous material so that they will be sheared when load is applied to the unit. Alternatively, they may be metallic in which case they would be removed after fitting the unit. In a further alternative, the bolts are of synthetic resinous material so that if the plates are left in place, the bolts will shear when load is applied to the unit.

It may sometimes be necessary to replace either of the blocks of the bearing unit in which case the structural member supported by the bearing would first be jacked up to relieve the bearing unit of load. Any bolts securing the blocks to their respective plate members would then be removed and to assist in the breaking of any joint between either of the blocks and the associated plate which may have been formed and this, of course, applies particularly if the block is bonded to the plate, a number of slots, one of which is shown at 15, are formed in each plate to extend in to the recess which receives the block to enable a crow bar to be inserted under the block in order to lift it from the plate. Preferably the corner of each block adjacent to the particular plate is chamfered.

Although cast-iron against stainless steel has been mentioned in the foregoing as a suitable bearing combination for the two blocks, other known combinations of metallic bearing materials may be used, for example, stainless (or corrosion resistant) steel against bronze or steel against bronze, one of the bearing surfaces being lined or faced as aforesaid. As alternatives to the above mentioned linings or facings, liners may be used from bearing materials including polyamide or superpolyamide resins, condensation products of the polyisocyanates, polyester resins, polythene and fluorocarbon polymers.

Whilst the use of the unit of the invention in bridge construction has been specifically referred to, the bearing unit has a wide variety of other uses as, for example, in the mounting of pipes in a refinery installation carrying hot or cold fluids, in long boilers, in other parts of processing plants, in the mounting of large machine tools or of wide roof or floor spans and in fact in any structure where a bowing or twisting of the supported structural member is required to be accommodated but where longitudinal restraint is required.

I claim:
1. A structural bearing unit comprising: a lower base plate, an upper load supporting plate, a pair of blocks disposed between said plates, said blocks having coacting spherical bearing surfaces, one of said blocks being recessed in said lower plate to prevent movement thereof in all directions in a plane parallel to said lower plate, the other of said blocks being recessed in said upper plate to prevent movement thereof in all directions in a plane parallel to said upper plate.

References Cited
UNITED STATES PATENTS

| | | | |
|---|---|---|---|
| 2,448,936 | 9/1948 | Van Zandt. | |
| 2,680,259 | 6/1954 | Milk | 14—16 |
| 2,711,352 | 6/1955 | Hasko et al. | 308—72 |
| 3,110,474 | 11/1963 | Circle | 308—135 X |
| 3,329,472 | 7/1967 | Donnellan et al. | 308—3 |

FREDERICK L. MATTESON, JR., *Primary Examiner.*

ROBERT A. DUA, *Assistant Examiner.*